Dec. 1, 1942.　　A. G. WILSON ET AL　　2,303,519
CONTROL MEANS FOR CHANGE-SPEED GEARS FOR MOTOR PROPELLED VEHICLES
Filed Jan. 31, 1940　　2 Sheets-Sheet 1

Inventors
A. G. Wilson &
A. H. Miller
by Glascock Downing & Seebold
Attys.

Dec. 1, 1942.      A. G. WILSON ET AL      2,303,519
CONTROL MEANS FOR CHANGE-SPEED GEARS FOR MOTOR PROPELLED VEHICLES
Filed Jan. 31, 1940      2 Sheets-Sheet 2

Inventors,
A. G. Wilson and A. H. Miller
By: Glascock Downing & Seebold Attorneys.

Patented Dec. 1, 1942

2,303,519

UNITED STATES PATENT OFFICE 2,303,519

CONTROL MEANS FOR CHANGE-SPEED GEARS FOR MOTOR PROPELLED VEHICLES

Andrew Gordon Wilson and Albert Arthur Miller, Coventry, England

Application January 31, 1940, Serial No. 316,690
In Great Britain February 1, 1939

1 Claim. (Cl. 74—472)

This invention relates to change-speed gear for motor propelled vehicles and has for its object to provide an improved form of control means for operating such gear.

The invention consists in control means for change-speed gear in which the movement of a single member from one gear position to another or to "neutral" position, or vice versa, brings about a corresponding change of gear ratio in the gearbox together with an appropriate control of the engine revolutions, during the transition period which exists between disengaging one gear and engaging another, in order to adjust the engine revolutions in relation to the new gear ratio.

The invention also consists in control means for change-speed gear in which the movement of a single control member from a low gear position to a higher gear position causes the engine revolution to be reduced during the transition between the disengaging of the low gear and the engaging of the higher gear, whilst movement of the said lever from a high gear position to a lower gear position causes the engine revolutions to remain constant or to increase during the whole or part of the transition from the high gear to the low gear.

Figure 1:
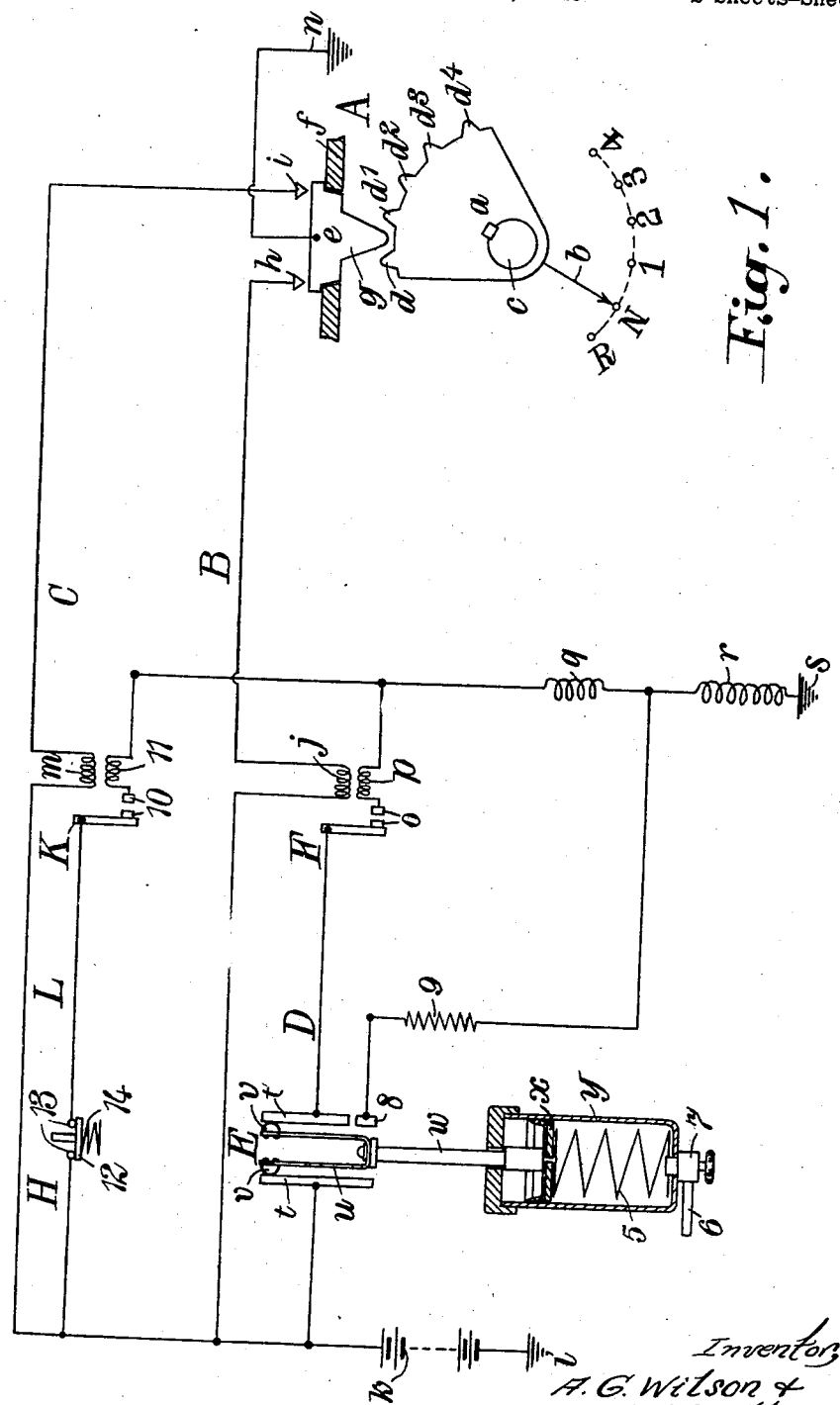

The invention will now be described with reference to the accompanying drawings which illustrate diagrammatically and by way of example, one embodiment of the control gear, Figure 1 showing the electric circuits and Figure 2 the mechanism operated thereby.

In carrying the invention into effect, there is provided a cam switch, denoted generally by the reference letter A, which is operatively connected with a gear changing mechanism such as that which is used in the Wilson epicyclic change speed gearbox and which is described in United States Patent No. 1,888,191. The cam switch A comprises a quadrant $a$ operatively connected with the selector lever $b$ which is rotatably mounted in the usual manner upon a fixed support $c$ such as the steering column of a vehicle, the arrangement being such that when the selector lever is swung into position to obtain the desired gear train, a corresponding swinging movement of the quadrant $a$ is effected about its pivot $c$.

The quadrant $a$ is provided along its arcuate edge with a series of cams or teeth $d$ which correspond in number to the different gear changes, and in the example illustrated, five such cams $d, d', d^2, d^3$, and $d^4$ are provided for effecting reverse, first, second, third and fourth speeds, the different positions of the selector lever $b$ for these speeds being designated by the references R, I, 2, 3 and 4. A neutral position N in which no gear is engaged may also be provided for, and in the example illustrated is arranged between reverse and first speeds R and I.

The cams $d$ during the oscillatory movement of the quadrant $a$ about its pivot $c$ are adapted to engage with a spring loaded two-way switch element $e$ which is mounted upon a fixed support $f$ and at its lower end is formed with a cam or V-shaped projection $g$ which extends into the path of movement of the cams $d$. When the quadrant $a$ is swung about its pivot $c$, the cams $d$ in passing engage the projection $g$ of the switch element $e$ and tilt said switch in one direction or the other according to the direction of rotation of the quadrant, to engage with one or other of a pair of contacts $h$ and $i$ arranged in two separate circuits denoted generally by the references B and C.

The circuit B, which will be referred to hereinafter as the primary "change-up" circuit in that it comes into operation when changing from a lower speed to a higher speed, has included therein the shunt winding $j$ of a relay or magnetic switch F and is fed from a battery $k$ or other source of electrical energy which is earthed at $l$. The circuit C, referred to hereinafter as the primary "change-down" circuit in that it comes into operation when changing from a higher speed to a lower speed, is arranged in parallel with the circuit B and being fed from the battery $k$ and having included therein the shunt winding $m$ of a magnetic or relay switch K. Both circuits B and C are completed through the switch element $e$ which is earthed at $n$.

Arranged in parallel with the primary "change-up" circuit B is a circuit D which will hereinafter be referred to as the secondary "change-up" circuit, the said circuit D being fed from the battery $k$ and within which is arranged a time switch E, the retention winding $p$ of the magnetic switch F having a pair of contacts $o$, and a pair of solenoid coils $q$ and $r$. The coil $q$ operates a valve M (Fig. 2) which is pneumatically connected on the one hand through a pipe line 50, with a servomotor N operatively connected to a Wilson gearbox O, and on the other hand through a pipe line 51 with the induction manifold P of an internal combustion engine, whilst the other coil $r$ operates the throttle R of said engine. The circuit D is completed by being earthed at $s$.

The time switch E consists of a pair of fixed contact plates $t$ between which is slidably mounted a yoke or U-shaped member $u$ the two arms of which support a pair of contacts or bushes $v$ which bear against the inner surfaces of the fixed contacts $t$. The yoke $u$ is connected at its lower end to a piston rod $w$ of a piston $x$ adapted to slide within a cylinder $y$, the said piston being normally held in its raised position by means of a spring 5. At its lower end the cylinder $y$ is provided with a pipe line 6 which communicates with the interior of the cylinder through an adjustable valve 7 the other end of said pipe line being connected through the pipe line 50 to the vacuum servomotor N, on the one hand and to the valve M on the other. It will be seen that one of the contact plates $t$ is made shorter than the other, this difference in length being made up by a contact 8 which is arranged below the shorter contact plate $t$ and separate therefrom, the said contact 8 being connected through a compensating resistance 9 direct to the throttle coil $r$.

Arranged in parallel with the primary "change-down" circuit C is a circuit L which will hereinafter be referred to as the secondary "change-down" circuit, the said circuit L being also fed from the battery $k$, and within which is arranged a switch H, the retention winding 11 of the relay or magnetic switch K having a pair of contacts 10, and the pair of solenoid coils $q$ and $r$ already referred to. The switch H comprises a plunger contact 12 which is normally pressed against a pair of contacts 13 by means of a spring 14, the plunger contact 12 being adapted to be disengaged from the contacts 13 by the bus-bar mechanism of the gear box at the end of the gear disengaging stroke.

Figure 2:
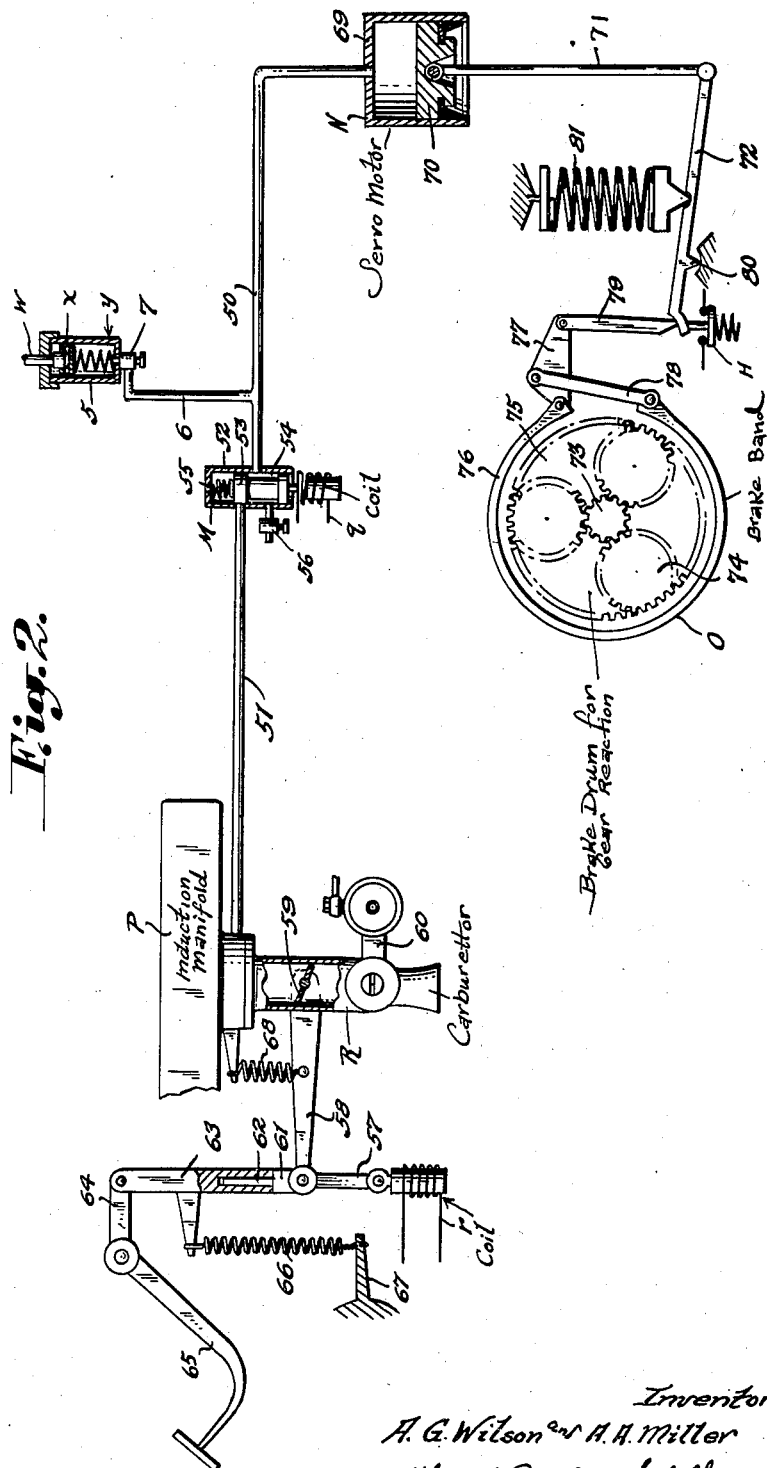

As will be seen from Figure 2 the valve M comprises a cylinder 52 within which is slidably mounted a plunger piston 53 which is reduced at its central portion to form an annular space 54 and is connected at one end to the solenoid $q$. A compression spring 55 is mounted between the upper face of the piston and the end of the cylinder, which spring normally tends to force the piston downwards into the position shown in the drawings, in which position the pipe line 51 leading from the induction manifold P is closed, whilst the other pipe line 50 leading to the time switch E and servomotor N is in communication with the annular space 54 formed between the reduced center portion of the piston 53 and the wall of the cylinder 52. An adjustable vent 56 is provided at one end of the cylinder 52, which vent is open to the atmosphere and normally communicates with the annular space 54.

The solenoid $r$ is connected by means of a rod 57 to the outer end of the throttle lever 58 which operates the throttle valve 59 mounted in the induction manifold P, the latter being provided at its lower end with a carburetter 60 in the usual manner. The throttle lever 58, at its outer end, is also formed with a boss or extension piece 61 having a link rod 62 which is adapted to slidably engage within the recessed lower end of a link 63 the other end of which is pivotally connected to a lever arm 64 secured to the accelerator pedal 65.

The usual return spring 66 is provided for closing the throttle valve when pressure on the accelerator pedal is released, the said spring being connected at one end to the link 63 and at its other end to a fixed part of the engine 67. In addition a light spring 68 is connected on the one hand to the throttle lever 58 and on the other hand to the induction manifold P, the purpose of said spring being to maintain the boss 61 and link rod 62 of the throttle lever in engagement with the lower end of the link 63, so that said lever may normally follow the movements of the accelerator pedal and at the same time to permit the solenoid $r$ to close the throttle irrespective of the position of the accelerator pedal.

The servomotor N comprises a cylinder 69 the upper end of which is in communication with the pipe line 50 and within which is slidably mounted a piston 70, the latter being connected, by a rod 71, to one end of a bus-bar 72 of the gear box O, which in the example illustrated is of the known Wilson type, comprising a series of epicyclic change speed groups, one of which groups is shown diagrammatically in Figure 2. Each group comprises a sun pinion 73 and planet pinion 74 engaging a toothed annulus having a brake drum 75 for gear reaction. Around each brake drum is a brake band 76, one end of which is pivoted direct to the lower corner of a triangular-shaped thrust pad 77, whilst the other end of said band is pivotally connected, through a pull rod 78, to the apex of said pad. The other corner of the pad 77 is connected to one end of a strut 79 which at its opposite end is supported upon the bus-bar 72 fulcrummed at 80 upon a fixed part of the gear box. A pressure spring 81 is mounted between the bus-bar and the gear box casing, on the opposite side of the fulcrum 80 to that of the strut 79, for the purpose of normally applying the brake band 76 and thus operating the gear.

Assuming the selector lever to be in the second gear position in which the second gear is engaged, the two-way switch element $e$ is in its central or balanced position with its projecting portion $g$ depending midway between the two cams or teeth $d^2$ and $d^3$ of the quadrant $a$ corresponding to the second and third speeds respectively. In this position the switch element $e$ is disengaged from both of the contacts $h$ and $i$ so that the primary "change-up" and "change-down" circuits B and C remain open. Assuming now that it is desired to bring the third speed gear into operation, then the selector lever $b$ is swung from the position 2 into position 3. During this arcuate movement the quadrant $a$ is partially rotated about its pivot $c$ in a counter-clockwise direction whereby the cam $d^3$ corresponding to third speed is brought into engagement with the projection $g$ and in passing same tilts the switch element $e$ in a clockwise direction so that it bears momentarily against the contact $h$, the cam $d^3$ finally coming to rest on the opposite side of the projection $g$, whereupon the switch element drops back again to its normal position with its projection $g$ now midway between the cams $d^3$ and $d^4$ corresponding to third and fourth speeds respectively.

During this tilting movement of the two-way switch element $e$, the primary "change-up" circuit B will be momentarily completed from the battery $k$ through the shunt coil $j$ of the "change-up" relay F, contact $h$, and switch element $e$ to earth $n$. This momentary flow of current in the shunt winding $j$ causes the relay F to become energised and close the contacts $o$ of said relay thereby completing the secondary "change-up" circuit D from the battery $k$ via the time-switch E, relay contacts $o$ and retention winding $p$, pneumatic valve coil $q$ and throttle coil $r$ to earth $s$. The energising of the solenoid $q$ causes the rod 57 and throttle lever 58 to be drawn downwards, against the action of the light spring 68, thus closing the throttle valve 59, this movement being allowed for by the telescopic engagement of the link rod 62 with the link member 63 of the accelerator pedal. At the same time energisation of the other solenoid $r$ causes the piston 53 of valve M to move upwardly against the action of the spring 55, to close the vent 56 and open the pipe line 51 to the annular space 54 in the cylinder 52. In this way vacuum is applied through the pipe line 50 to the interior of the cylinder 69 of the servomotor, thus causing the piston 70 to move upwardly and rock the bus-bar 72 in a counterclockwise direction about its fulcrum 80, against the action of the spring 81. This causes the strut 79 to drop and with it the thrust pad 77 and pull rod 78, thereby releasing the brake band 76 and disengaging the gear. At the same time, vacuum acts upon the interior of the pneumatic cylinder $y$ through the pipe line 6 and adjustable valve 7, thereby causing the piston $x$ to move slowly downwards within said cylinder and to impart a similar movement to the yoke member $u$ carrying the contacts $v$ which slide over the stationary contact plates $t$ of the time switch E.

After a predetermined period, for example, two seconds, that contact $v$ which engages the shorter of the two contact plates $t$ supplying current to the "change-up" relay F, leaves the said plate and engages the contact 8, whereupon the secondary "change-up" circuit D is broken and current is now supplied from the battery $k$ through the time switch E and compensating resistance 9 direct to the throttle coil $r$. That is to say, after the gear has been disengaged for about two seconds, during which time the throttle or the like is held closed to reduce the engine speed, the secondary "change-up" circuit D is broken by the time-switch E whilst the throttle circuit is maintained closed. The solenoid $q$ is now de-energised and the piston 53 of the valve M is returned to its lower position under the action of the spring 55 in which position the vacuum is turned off from the bus-bar servomotor and atmosphere admitted, so that the bus-bar returns and engages the third speed gear. As soon as the new gear engages and the pressure rises in the servomotor as a result thereof, the piston $x$ of the time-switch commences to return under the action of the spring 5, and with it the contacts $v$ of the said switch, thereby interrupting the supply of current to the throttle coil $r$, so that the throttle or the like re-opens (assuming the driver has the accelerator pedal or the like depressed).

A similar sequence of operations to that described above, is also performed in "changing-up" from third to fourth speed only in this case it is the cam $d^4$ corresponding to fourth speed which actuates the switch element $e$, which is now located between the cams $d^3$ and $d^4$.

When it is desired to change down to a lower gear, as for example from fourth speed to third speed, the selector lever $b$ is swung from position 4 into position 3 corresponding to this lower gear. During this arcuate movement the quadrant $a$ is partially rotated about its pivot $c$ in a clockwise direction whereby the cam $d^4$ corresponding to this change of speed, is brought into engagement with the projection $g$ of the two-way switch $e$ and in passing same tilts the said switch in a counterclockwise direction, so that it bears momentarily against the contact $i$, the cam $d^4$ finally coming to rest on the opposite side of the projection $g$ whereupon the switch element $e$ drops back again to its normal position.

During this tilting movement of the two-way switch element $e$, the primary "change-down" circuit C will be momentarily closed from the battery $k$ through the shunt coil $m$ of the "change-down" relay K, contact $i$, switch element $e$ to earth $n$. This momentary flow of current in the shunt winding $m$ causes the relay K to become energised and close the contacts 10 of said relay thereby completing the secondary "change-down" circuit L from the battery $k$ via the switch H controlled by the bus-bar 72, the relay contacts 10 and retention winding 11 of the relay K, pneumatic valve coil $q$ and the throttle coil $r$ to earth $s$. The throttle or the like is thereupon closed and vacuum is applied to the bus-bar servomotor to depress said bar into its gear disengaging position. This time however the circuit is via the bus-bar switch H and is therefore interrupted the moment the depression stroke is completed by the bus-bar moving the plunger 12 out of engagement with the contacts 13. As a result, the pneumatic valve and throttle coils $q$ and $r$ are deenergised, thus causing the vacuum to be turned off from the servomotor, and atmosphere admitted so that the bus-bar commences to return to engage the third gear, and at the same time the throttle or the like is opened (assuming that the driver has the accelerator pedal or the like depressed), it being understood that the atmospheric vent in the valve M pneumatically connected with the servomotor is so adjusted that the time taken for the bus-bar fully to return and engage the new gear is sufficient to enable the engine to speed up to synchronise approximately with the new gear.

We claim:

A control means for a servo mechanism operating a change speed gear and for an engine throttle comprising change up and change down circuits for controlling the servo mechanism and throttle, magnetic switches interposed in said circuits for maintaining the latter closed, an actuating circuit associated with each of the first mentioned circuits including means for actuating the magnetic switches, a selector lever, and a selector switch for selectively closing the actuating circuits in dependence upon the extent and the direction of movement of the selector lever, said selector switch including contacts and an element spring loaded to a central position in which both of the actuating circuits are open, a series of cams movable with said selector lever adapted when the selector lever is moved from one position to the next in the change up direction to tilt the switch element in one direction momentarily when passing thereby causing said switch element to close one of said contacts and, when the selector lever is moved from one position to the next in the change-down direction, to tilt the switch element in the opposite direction to close the other of said contacts.

A. GORDON WILSON.
A. A. MILLER.